United States Patent Office 2,758,443
Patented Aug. 14, 1956

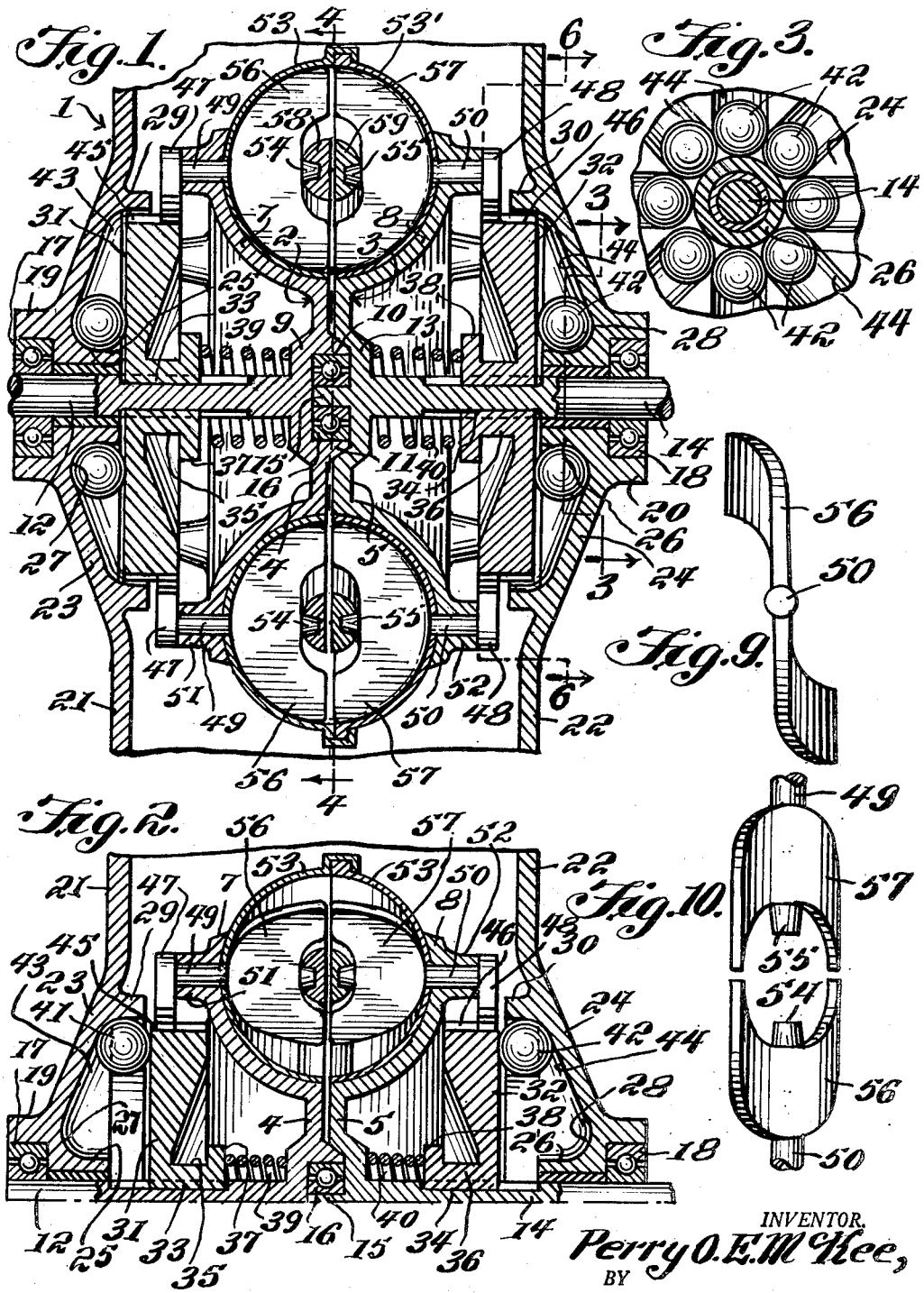

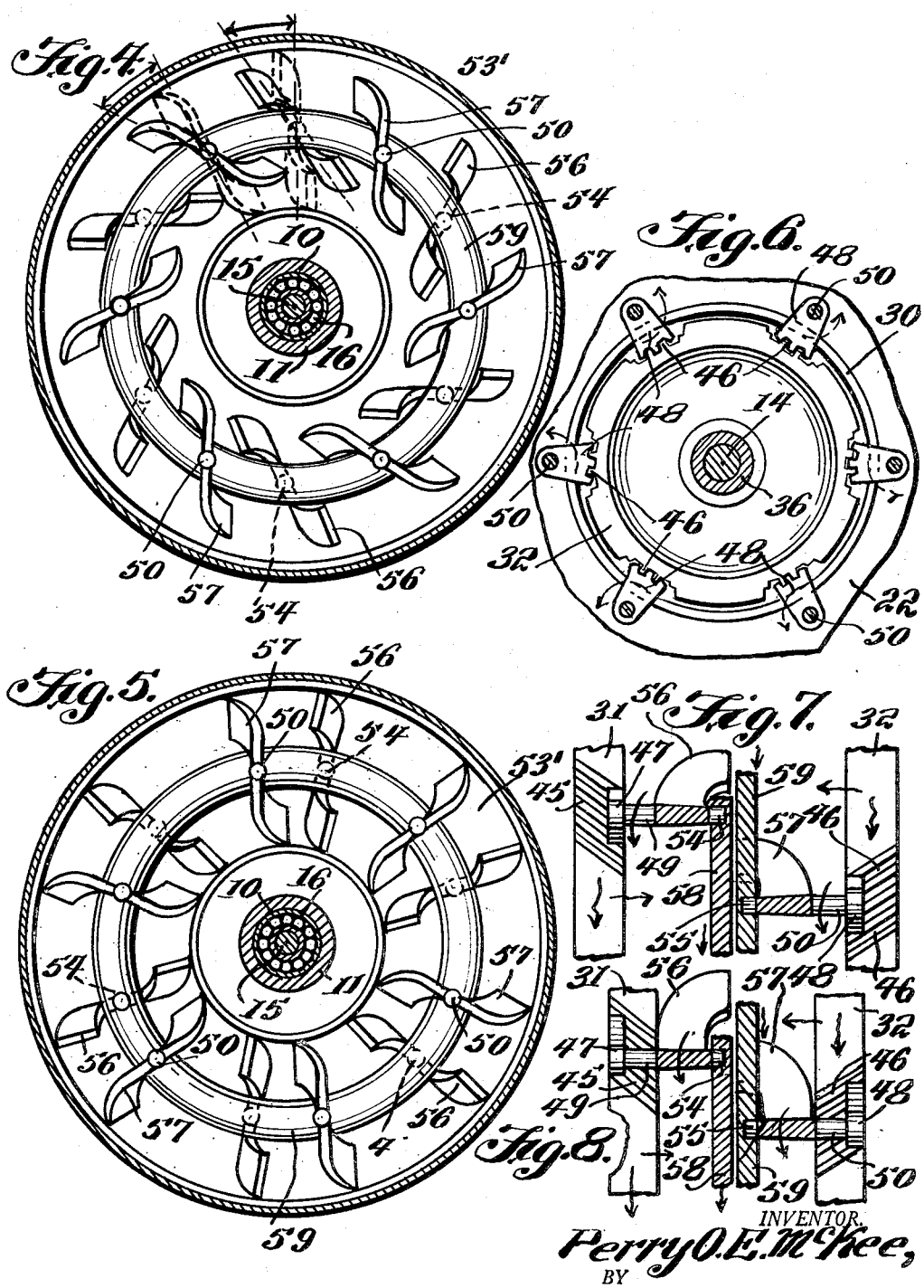

2,758,443

FLUID COUPLING

Perry Owen E. McKee, Green Castle, Mo.

Application February 19, 1954, Serial No. 411,484

2 Claims. (Cl. 60—54)

This invention relates to fluid coupling devices, and more specifically to fluid couplings of the turbine type.

One of the primary objects of this invention is to provide a fluid coupling of the type described having a plurality of blades disposed therein, and centrifugally operated means for effecting a change in the pitch of the blades.

Another object of this invention is to provide a fluid coupling utilizing a centrifugally operated gear train for effecting a change in the pitch of the blades of the coupling.

A still further object of this invention is to provide a fluid coupling which is non-complex in construction and operation, and inexpensive to manufacture and maintain.

Other and further objects and advantages of this invention will become apparent from a consideration of the following specification when read in the light of the appended drawings, in which:

Figure 1 is a vertical axial cross-sectional view of a fluid coupling constructed in accordance with the teachings of this invention, the blades of the coupling being illustrated at their high speed positions;

Figure 2 is a partial cross-sectional view of the coupling shown in Figure 1, the blades, however, being shown in their respective low speed positions;

Figure 3 is a detail cross-sectional view taken on the vertical plane of line 3—3 of Figure 1 illustrating elements of the centrifugal governor;

Figure 4 is a medial cross-sectional view taken on the vertical plane of line 4—4 of Figure 1, looking in the direction of the arrows and illustrating the position of the blades under low speed conditions;

Figure 5 is a medial cross-sectional view similar to Figure 4, illustrating the position of the blades of the device under high speed conditions;

Figure 6 is a detailed partial end elevation taken on the vertical plane of line 6—6 of Figure 1, looking in the direction of the arrows;

Figure 7 is a detail cross-sectional view, partly in elevation, illustrating the position of a pair of opposed cooperating blades under high speed conditions and the fluid flow therebetween;

Figure 8 is a detail cross-sectional view, similar to Figure 7, illustrating the position of a pair of opposed cooperating blades under low speed conditions and the fluid flow therebetween;

Figure 9 is an end elevation of one of the blades of the fluid coupling constructed in accordance with this invention; and Figure 10 is a perspective view of a pair of cooperating blades in a driving relationship of substantially 1:1.

Referring now more specifically to the drawings, the reference numeral 1 designates, in general, a fluid coupling constructed in accordance with this invention. The coupling comprises a pair of opposed circular discs, 2 and 3, each having a centrally depressed integrally formed center wall 4 and 5, respectively, and integrally formed offset and arcuately shaped side walls 7, 8 which project laterally therefrom and continue to the periphery of their respective discs.

The center wall 4 is constructed with an axially positioned enlarged boss 9 having a recess 10 extending inwardly from a hub 11. A drive shaft 12 is integrally formed with the boss 9 and projects laterally from the other side thereof in coaxial alignment with the recess 10.

The disc 3 is provided with an axial offset portion 13 adapted to interfit and rotate with and about the hub 11. A driven shaft 14 is integrally formed with the offset portion 13 and projects laterally away from one side thereof, and an integral stud shaft 15 projects laterally from the other of its sides and is journaled in bearings 16 housed in the recess 10. As is clearly seen in Figure 1, shafts 12, 14 and 15 are coaxially aligned.

The outer ends of the shafts 12 and 14 are journaled in bearings 17 and 18, respectively, disposed in external hollow bosses 19, 20 of a split housing having sections indicated at 21 and 22. The end walls of the housing sections 21, 22 adjacent their respective bosses 19, 20 are bowed outwardly away from each other to form the inclined side walls 23, 24, terminating in the internal integrally formed and opposed bosses 25, 26 which are circumferentially grooved at 27, 28 to serve a function to be described. The inclined walls 23, 24 are also provided with integral internal opposed and circumferential flanges 29 and 30 spaced from their respective internal bosses 25, 26.

Plates 31, 32 are splined for axial movement at 33, 34 and are formed with collars 35, 36 projecting laterally from one side thereof which terminate in enlarged circumferential and oppositely disposed flanges 37, 38. Helical springs 39, 40 surround portions of the shafts 12 and 14, with one end of the spring 39 engaging against the flange 37 and the other end abutting the boss 9, while the opposite ends of the spring 40 are confined between the offset 13 and the flange 38.

It is manifest that from the above description the plates 31, 32 are constantly urged to move axially on their respective shafts away from each other and toward the adjacent internal bosses 25, 26.

A plurality of centrifugally actuated balls 41, 42 are disposed in the grooves 27, 28 and bear against their adjacent plates 31, 32, and it is to be understood that the plates 31, 32, walls 23, 24, and bosses 25, 26 cooperate to form a pair of chambers 43, 44 subject to variation in volume due to the longitudinal shifting of the plates on their respective shafts.

Referring now to Figures 1 and 6, the peripheries of the plates 31, 32 are recessed at spaced intervals and are provided with helical gear teeth 45, 46 which mesh with the teeth of sector gears 47, 48. The gears 47, 48 are connected with one end of shafts 49, 50 which extend through bosses 51, 52 carried externally of the arcuate side walls 7, 8, and through the wall of the cylindrical split and endless tubular member 53, 53' at diametrically opposed spaced intervals. As seen in Figures 1, 2, 7, 8 and 10, the shafts 49, 50 pass through hub portions 54, 55 of a plurality of rotor blades 56, 57 disposed within the tubular members 53, 53' and terminate in support rings 58, 59.

Having described the component elements of this invention in detail the operation thereof is deemed obvious to those skilled in the art. Assuming that the member 53, 53' has been filled with a fluid and the device is at rest with the drive shaft connected with motor means (not shown), upon actuation of the motor means, the shaft 12 is rotated causing rotation of the plate 31 and part 53 of the tubular member. The blades 56 and 57 are both substantially at the pitch shown in Figure 4 with a low angle of attack. Now as the speed of the plates 31, 32 increase, the centrifugal force exerted on the balls 41, 42 causes them to move outwardly and radially from the shafts 12, 14 thereby exerting a lateral thrust on the plates to effect movement thereof toward each other. As this movement takes place, gear teeth 45, 46 cooperate with the segmental gears 47, 48 to turn the shafts 49, 50 and consequently the blades 56, 57 until they assume the position shown in Figure 5 wherein the turbine effect has been substantially eliminated and a fluid drive of approximately 1:1 relationship is established.

Having described this invention in detail, it is to be understood that it is offered by way of example, and that the invention is to be limited only by the scope of the following claims.

What is claimed is:

1. A fluid coupling device comprising a split toric body containing liquid, said body embodying mating sections connected together for rotary movement about a common axis relative to each other, power input and output shafts lying along said common axis and connected to respective ones of said sections, a plurality of vanes mounted in each of said sections for movement about circumferentially spaced parallel axes, with an axis in one section in transverse alignment with a corresponding one of the axes in the other section, and means responsive to the speed of rotation of said input and output shafts for moving all of the vanes in each of said sections about their respective axes to effect a change in the pitch of said vanes, said means including a pair of spaced plates, one plate mounted on each of the respective shafts for movement longitudinally thereof, means operatively connected between each of said plates and an associated section for moving the vanes mounted therein about their axes, means on said shafts responsive to rotation thereof to move said plates and actuate said means operatively connected between said plates and said sections to thereby cause rotation of said vanes about their axes for effecting a change in the pitch of said vanes.

2. A fluid coupling device comprising a split toric body containing liquid, said body embodying mating sections adapted for rotary movement about a common axis relative to each other, power input and output shafts lying along said common axis and connected to respective ones of said sections, a plurality of vanes mounted in each of said sections for movement about circumferentially spaced parallel axes, with an axis in one section in transverse alignment with a corresponding one of the axes in the other section, and means responsive to the speed of rotation of said input and output shafts for moving all of the vanes in each of said sections about their respective axes to effect a change in the pitch of said vanes, said means including a pair of spaced plates, one plate mounted on each of the respective shafts for movement longitudinally thereof, each of said plates having about its periphery a plurality of circumferentially spaced helical gearing sections, gears on each of said sections mounted for rotation about each of the parallel axes thereof and in mesh with one of said helical gearing sections and operatively connected to respective vanes on said axes, means on said shafts responsive to the speed of rotation thereof for moving said plates longitudinally of the shafts causing said helical gearing sections to rotate said gears about their axes for rotating all of said vanes about said axes thereby effecting a change in the pitch of the vanes corresponding to the speed of rotation of said shafts.

References Cited in the file of this patent

UNITED STATES PATENTS

| | | |
|---|---|---|
| 2,200,596 | Dodge | May 14, 1940 |
| 2,471,179 | Wemp | May 24, 1949 |
| 2,544,713 | Miller | Mar. 13, 1951 |
| 2,587,154 | Hartz | Feb. 26, 1952 |
| 2,616,537 | Grattan | Nov. 4, 1952 |